United States Patent
Oniwa et al.

(10) Patent No.: US 11,287,879 B2
(45) Date of Patent: Mar. 29, 2022

(54) DISPLAY CONTROL DEVICE, DISPLAY CONTROL METHOD, AND PROGRAM FOR DISPLAY BASED ON TRAVEL CONDITIONS

(71) Applicant: HONDA MOTOR CO., LTD., Tokyo (JP)

(72) Inventors: Yoshihiro Oniwa, Wako (JP); Takemi Tsukada, Wako (JP); Mineyuki Yoshida, Wako (JP); Fue Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/632,888

(22) PCT Filed: Aug. 25, 2017

(86) PCT No.: PCT/JP2017/030540
§ 371 (c)(1),
(2) Date: Jan. 22, 2020

(87) PCT Pub. No.: WO2019/038914
PCT Pub. Date: Feb. 28, 2019

(65) Prior Publication Data
US 2020/0209959 A1    Jul. 2, 2020

(51) Int. Cl.
*B60R 1/00*  (2006.01)
*G06F 3/01*  (2006.01)
(Continued)

(52) U.S. Cl.
CPC ................ *G06F 3/013* (2013.01); *B60R 1/00* (2013.01); *G06K 9/00671* (2013.01);
(Continued)

(58) Field of Classification Search
CPC  G06F 3/013; G06K 9/00671; G06K 9/00805; B60R 1/00; B60R 2300/10; B60R 2300/20; B60R 2300/80; G06T 13/80
See application file for complete search history.

(56) References Cited

U.S. PATENT DOCUMENTS

| 2012/0182426 | A1* | 7/2012 | Fukuda | G08G 1/166 |
| | | | | 348/148 |
| 2014/0036063 | A1* | 2/2014 | Kim | B60R 1/00 |
| | | | | 348/118 |

(Continued)

FOREIGN PATENT DOCUMENTS

| CN | 104512337 | 4/2015 |
| CN | 106030679 | 10/2016 |

(Continued)

OTHER PUBLICATIONS

Chinese Office Action for Chinese Patent Application No. 201780092429.X dated Sep. 18, 2020.
(Continued)

*Primary Examiner* — Terrell M Robinson
(74) *Attorney, Agent, or Firm* — Amin, Turocy & Watson, LLP (57) ABSTRACT

A display control device includes a display configured to display a peripheral image indicating a peripheral situation of a host vehicle in a display range viewed from a predetermined virtual viewpoint and a display range determiner configured to determine a viewpoint position of the virtual viewpoint, an angle of view from the virtual viewpoint, or a gaze direction from the virtual viewpoint in accordance with a traveling condition of the host vehicle.

8 Claims, 9 Drawing Sheets

(51) Int. Cl.
*G06K 9/00* (2022.01)
*G06T 13/80* (2011.01)

(52) U.S. Cl.
CPC ......... *G06K 9/00805* (2013.01); *G06T 13/80* (2013.01); *B60R 2300/10* (2013.01); *B60R 2300/20* (2013.01); *B60R 2300/80* (2013.01)

(56) References Cited

U.S. PATENT DOCUMENTS

| | | | | |
|---|---|---|---|---|
| 2014/0300743 | A1* | 10/2014 | Kumon | G06T 11/00 348/148 |
| 2016/0350974 | A1* | 12/2016 | Hashimoto | G06T 19/006 |
| 2017/0195564 | A1* | 7/2017 | Appia | H04N 5/23238 |
| 2020/0020235 | A1* | 1/2020 | Smith | H04N 7/181 |
| 2020/0184722 | A1* | 6/2020 | Watanabe | H04N 7/181 |

FOREIGN PATENT DOCUMENTS

| | | |
|---|---|---|
| EP | 2581875 | 4/2013 |
| JP | 11-339192 | 12/1999 |
| JP | 11339192 A * | 12/1999 |
| JP | 2010-079455 | 4/2010 |
| JP | 2010-228471 | 10/2010 |
| JP | 2010228471 A * | 10/2010 |
| JP | 2011-257940 | 12/2011 |
| JP | 2012-195793 | 10/2012 |
| JP | 2012195793 A * | 10/2012 |
| JP | 2017-069852 | 4/2017 |

OTHER PUBLICATIONS

International Search Report and Written Opinion for International Application Serial No. PCT/JP2017/030540 dated Nov. 14, 2017, 10 pages.

* cited by examiner

DISPLAY CONTROL DEVICE, DISPLAY CONTROL METHOD, AND PROGRAM FOR DISPLAY BASED ON TRAVEL CONDITIONS

TECHNICAL FIELD

The present invention relates to a display control device, a display control method, and a program.

BACKGROUND ART

In the past, there has been a display control device that converts an image captured by imaging means installed in a vehicle into an image viewed from a virtual viewpoint changed in a relationship with another vehicle and displays the converted image (see, for example, Patent Literature 1).

CITATION LIST

Patent Literature

[Patent Literature 1]
Japanese Unexamined Patent Application, First Publication No. 2017-069852

SUMMARY OF INVENTION

Technical Problem

However, situations desired to be confirmed in the vicinity of a host vehicle vary according to the state of the host vehicle. For example, during traveling and parking, ranges desired to be confirmed in the vicinity of the vehicle are different from each other. Therefore, in a case where a virtual viewpoint is changed in a relationship with another vehicle, appropriate display of the vicinity of the host vehicle according to the state of the vehicle may not be able to be performed.

The present invention was contrived in view of such circumstances, and one object thereof is to provide a display control device, a display control method, and a program that make it possible to perform appropriate display of the vicinity of a host vehicle according to the state of the vehicle.

Solution to Problem (1) There is provided a display control device including: a display configured to display a peripheral image indicating a peripheral situation of a host vehicle in a display range viewed from a predetermined virtual viewpoint; and a display range determiner configured to determine a viewpoint position of the virtual viewpoint, an angle of view from the virtual viewpoint, or a gaze direction from the virtual viewpoint in accordance with a traveling condition of the host vehicle.

(2) In (1), the traveling condition of the host vehicle includes a speed of the host vehicle, and the display range determiner changes the display range of the peripheral image by changing the viewpoint position, the angle of view, or the gaze direction in accordance with the speed of the host vehicle.

(3) In (2), the display range determiner changes the viewpoint position, the angle of view, or the gaze direction so as to include a longer distance in front of the host vehicle in the display range of the peripheral image as the speed of the host vehicle increases.

(4) In (3), the display range determiner includes a longer distance in front of the host vehicle in the display range of the peripheral image by reducing an angle of depression in the gaze direction.

(5) In according to any one of (1) to (4), the display range determiner determines the display range of the peripheral image as a range in which the host vehicle is viewed from above within a predetermined distance from the host vehicle.

(6) In according to any one of (1) to (5), the display range determiner widens the display range of the peripheral image by raising the viewpoint position, and narrows the display range of the peripheral image by lowering the viewpoint position.

(7) In according to any one of (1) to (6), the display range determiner determines the display range of the peripheral image so as to include a situation within a predetermined distance from a rear end portion of the host vehicle.

(8) In according to any one of (2) to (7), the display range determiner reduces an amount of change in the viewpoint position, the angle of view, or the gaze direction as the speed of the host vehicle increases.

(9) In according to any one of (1) to (8), the display control device further includes an object recognizer configured to recognize an object present in the vicinity of the host vehicle, the peripheral image is configured such that a relative positional relationship between the host vehicle and the object recognized by the object recognizer is capable of being recognized by an occupant of the host vehicle, and the display range determiner changes the relative positional relationship when the display range of the peripheral image is changed.

(10) In according to any one of (1) to (9), the display control device further includes an object recognizer configured to recognize an object present in the vicinity of the host vehicle and a display data generator configured to generate a peripheral image that is an animation image indicating a peripheral situation of the host vehicle on the basis of a detection result of the object recognizer and a determination result of the display range determiner, and the display displays the peripheral image generated by the display data generator.

(11) There is provided a display control method including causing a computer to: determine a viewpoint position of a predetermined virtual viewpoint, an angle of view from the virtual viewpoint, or a gaze direction from the virtual viewpoint in accordance with a traveling condition of a host vehicle; and display a peripheral image indicating a peripheral situation of the host vehicle on a display in a display range viewed from the virtual viewpoint.

(12) There is provided a program causing an in-vehicle computer to: determine a viewpoint position of a predetermined virtual viewpoint, an angle of view from the virtual viewpoint, or a gaze direction from the virtual viewpoint in accordance with a traveling condition of a host vehicle; and display a peripheral image indicating a peripheral situation of the host vehicle on a display in a display range viewed from the virtual viewpoint.

Advantageous Effects of Invention

According to (1) to (12), it is possible to perform appropriate display of the vicinity of the host vehicle according to the state of the vehicle.

DESCRIPTION OF EMBODIMENTS

Hereinafter, an embodiment of a display control device, a display control method, and a program of the present invention will be described with reference to the accompanying drawings.

The embodiment shows a case where a result of recognition of the vicinity of a vehicle is displayed when the display control device performs automated driving (autonomous driving), as an example. The automated driving refers to causing a vehicle to travel by automatically performing at least one of steering control or speed control irrespective of an occupant's operation, and is a type of driving assistance. In addition, the "occupant" is assumed to be an occupant who sits on a driver's seat, that is, a seat provided with a driving operator.

[Overall Configuration]

Figure 1:
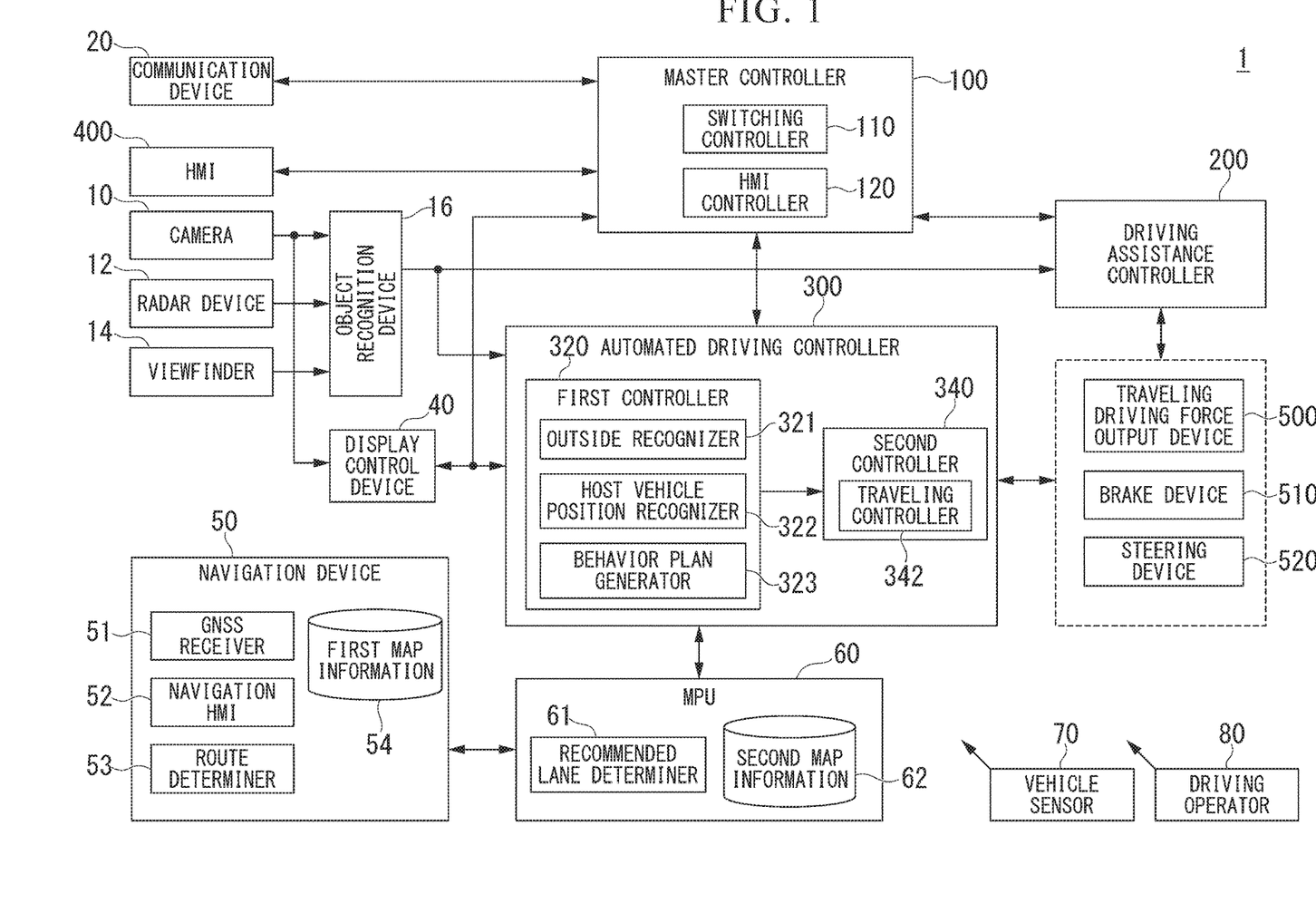
FIG. 1 is a configuration diagram of a vehicle system 1 including a display control device 40 of an embodiment.

FIG. 1 is a configuration diagram of a vehicle system 1 including the display control device of the embodiment. A vehicle in which the vehicle system 1 is mounted (hereinafter referred to as a host vehicle M) is, for example, a two-wheeled, three-wheeled, or four-wheeled vehicle or the like, and the driving source is an internal-combustion engine such as a diesel engine or a gasoline engine, an electric motor, or a combination thereof. The electric motor operates using power generated by a generator connected to an internal-combustion engine or power discharged from a secondary battery or a fuel cell.

In FIG. 1, the vehicle system 1 includes, for example, a camera 10, a radar device 12, viewfinder 14, an object recognition device 16, a communication device 20, a display control device 40, a navigation device 50, a map positioning unit (MPU) 60, a vehicle sensor 70, a driving operator 80, a master controller 100, a driving assistance controller 200, an automated driving control unit 300, a human machine interface (HMI) 400, a traveling driving force output device 500, a brake device 510, and a steering device 520. These devices or instruments are connected to each other through a multiplex communication line such as a controller area network (CAN) communication line, a serial communication line, a wireless communication network, or the like. The configuration of the vehicle system 1 shown in FIG. 1 is merely an example, and some portions of the configuration may be omitted, or other configurations may be further added.

The camera 10 captures an image of the vicinity of the host vehicle, and generates a captured image. The camera 10 is a digital camera using a solid-state imaging element such as, for example, a charge coupled device (CCD) or a complementary metal oxide semiconductor (CMOS). The camera 10 is installed at any points on the host vehicle M having the vehicle system 1 mounted therein. The vicinity of the host vehicle includes the front of the host vehicle, and may include the side or rear of the host vehicle. In a case where a forward image is captured, the camera 10 is installed on the upper portion of the front windshield, the rear surface of the rear-view mirror, or the like. In a case where a rearward image is captured, the camera 10 is installed on the upper portion of the rear windshield, the back door, or the like. In a case where a sideward image is captured, the camera 10 is installed on the side mirror or the like. The camera 10, for example, repeatedly captures an image of the vicinity of the host vehicle M periodically. The camera 10 may be a stereo camera.

The camera 10 generates a captured image at a predetermined angle of view by using a lens having a predetermined focal length. The central position of a captured image can be changed by changing the imaging direction of the camera 10. In a case where there are a plurality of cameras 10, a captured image is generated in each of the cameras 10. The imaging position of the camera 10 is set as an actual viewpoint position of a captured image.

The radar device 12 radiates radio waves such as millimeter waves to the vicinity of the host vehicle M in a predetermined irradiation direction, and detects radio waves (reflected waves) reflected from an object to detect at least the position (distance to and orientation of) of the object. The object is, for example, another vehicle, an obstacle, a structure, or the like that is present in the vicinity of the host vehicle. One or a plurality of radar devices 12 are installed at any points of the host vehicle M. The radar device 12 may detect the position and speed of an object with a frequency modulated continuous wave (FMCW) system.

The viewfinder 14 is a light detection and ranging or laser imaging detection and ranging (LIDAR) finder that measures scattered light with respect to irradiation light with which the vicinity of the host vehicle M is irradiated in a predetermined irradiation direction, and detects a distance to an object. One or a plurality of viewfinders 14 are installed at any points on the host vehicle M.

The object recognition device 16 recognizes the position, type, speed or the like of an object present in the vicinity of the host vehicle by performing a sensor fusion process on detection results based on some or all of the camera 10, the radar device 12, and the viewfinder 14. In a case where the object is another vehicle, the object recognition device 16 outputs a recognition result to the driving assistance controller 200 and the automated driving control unit 300.

The communication device 20 communicates with, for example, another vehicle which is present in the vicinity of the host vehicle M, or communicates with various server devices through a wireless base station. The communication device 20 may acquire the type of another vehicle, the traveling condition (vehicle speed, acceleration, or traveling lane) of another vehicle, or the like by communicating with another vehicle which is present in the vicinity of the host vehicle M.

The display control device 40 acquires a captured image captured by the camera 10, and generates, for example, display data when the acquired image is displayed on a display device (to be described later) of the MI 400. The display control device 40 includes a processor such as a central processing unit (CPU). The details of the display control device 40 will be described later with reference to FIG. 2.

The navigation device 50 includes a global navigation satellite system (GNSS) receiver 51, a navigation HMI 52, and a route determiner 53, and holds a first map information 54. The GNSS receiver 51 acquires position information of the host vehicle M.

The MPU 60 holds a recommended lane determiner 61 and second map information 62. The recommended lane determiner 61 divides a route provided from the navigation device 50 into a plurality of blocks, and refers to the second map information 62 to determine a recommended lane for each block.

The second map information 62 is map information higher in accuracy than the first map information 54. The second map information 62 has, for example, information of the center of a lane, information of the boundary of a lane, road information, traffic regulations information, address information, facility information, telephone number information, or the like.

The vehicle sensor 70 includes, for example, a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like and detects the traveling condition of the host vehicle. The vehicle sensor 70 outputs a traveling condition such as a detected speed to the display control device 40.

The driving operator 80 includes, for example, an accelerator pedal, a brake pedal, a shift lever, a steering wheel, or the like.

[Master Controller]

The master controller 100 performs control or the like of the HMI 400 relevant to driving assistance. The master controller 100 includes, for example, a switching controller 110 and an HMI controller 120.

The switching controller 110 switches, for example, driving assistance on the basis of an operation signal which is input from predetermined switches (for example, a main switch and an auto switch to be described later) included in the HMI 400. In addition, the switching controller 110 may, for example, switch to manual driving by canceling driving assistance on the basis of an operation for indicating acceleration, deceleration or steering with respect to the driving operator 80 such as an accelerator pedal, a brake pedal, or a steering wheel.

The HMI controller 120 controls content which is output to the HMI 400. The HMI controller 120 acquires display data generated by the display control device 40, and causes the HMI 400 to display the acquired display data. In addition, the HMI controller 120 may output information accepted by the HMI 400 to any one of the driving assistance controller 200, the automated driving control unit 300, and the display control device 40.

[Driving Assistance Controller]

The driving assistance controller 200 executes driving assistance. The driving assistance controller 200 executes, for example, driving assistance control other than an ACC or an LKAS. For example, when the ACC is executed, the driving assistance controller 200 controls the traveling driving force output device 500 and the brake device 510 so as to travel in a state where an inter-vehicle distance between the host vehicle M and a preceding vehicle is kept constant on the basis of information which is input from the camera 10, the radar device 12, and the viewfinder 14 through the object recognition device 16. That is, the driving assistance controller 200 performs acceleration or deceleration control (speed control) based on an inter-vehicle distance from a preceding vehicle. In addition, when the LKAS is executed, the driving assistance controller 200 controls the steering device 520 so that the host vehicle M travels while keeping a traveling lane in which the vehicle is currently traveling. That is, the driving assistance controller 200 performs steering control for lane keeping.

[Automated Driving Control Unit]

The automated driving control unit 300 includes, for example, a first controller 320 and a second controller 340. The first controller 320 includes, for example, an outside recognizer 321, a host vehicle position recognizer 322, and a behavior plan generator 323. The outside recognizer 321 recognizes the peripheral situation of the host vehicle M. For example, the outside recognizer 321 recognizes states such as the position, speed, acceleration, and traveling lane of a nearby vehicle on the basis of information which is input from the camera 10, the radar device 12, and the viewfinder 14 through the object recognition device 16. The position of the nearby vehicle may be represented by a representative point such as the centroid or corner of the nearby vehicle, or may be represented by a region which is represented by the contour of the nearby vehicle. The "state" of the nearby vehicle may include the acceleration, jerk, or "behavior state" (for example, whether it is performing or attempting to perform a lane change) of the nearby vehicle. In addition, the automated driving control unit 300 is an example of an object recognizer.

In addition, the outside recognizer 321 may recognize the positions of an obstacle on a road, a guardrail, a telephone pole, a parked vehicle, a person such as a pedestrian, and other objects in addition to the nearby vehicle.

The host vehicle position recognizer 322 recognizes, for example, a lane in which the host vehicle M travels (a traveling lane), and the relative position and posture of the host vehicle M with respect to the traveling lane. The host vehicle position recognizer 322 recognizes the traveling lane, for example, by comparing the pattern (for example, an array of a solid line and a broken line) of a road division line which is obtained from the second map information 62 with the pattern of the road division line in the vicinity of the host vehicle M which is recognized from an image captured by the camera 10. The host vehicle position recognizer 322 may recognize the position or posture of the host vehicle M with respect to the traveling lane.

The behavior plan generator 323 generates a behavior plan for the host vehicle M to perform automated driving with respect to a destination or the like. For example, the behavior plan generator 323 determines events which are sequentially executed in automated driving control so as to travel along a recommended lane determined by the recommended lane determiner 61 and to be capable of coping with the peripheral situation of the host vehicle M. Examples of the events in automated driving include a constant speed traveling event of traveling along the same traveling lane at a constant speed, a low-speed following event of following a preceding vehicle on the condition of low speed (for example, 60 [km/h] or lower), a lane change event of changing the traveling lane of the host vehicle M, a passing event of passing a preceding vehicle, a merging event of causing a vehicle to merge at a merging point, a divergence event of causing the host vehicle M to travel in an objective direction at a divergence point of a road, an emergency stop event of urgently stopping the host vehicle M, and the like. In addition, during execution of these events, behavior for avoidance may be planned on the basis of the peripheral situation (such as the presence of a nearby vehicle or a pedestrian, or lane narrowing caused by road construction) of the host vehicle M.

The second controller 340 includes, for example, a traveling controller 342. The traveling controller 342 controls the traveling driving force output device 500, the brake device 510, and the steering device 520 so that the host vehicle M passes through the target trajectory generated by the behavior plan generator 323 on scheduled time.

The HMI 400 presents various types of information to an occupant inside the vehicle, and accepts the occupant's input operation. The HMI 400 includes, for example, some or all of various display devices, a light emitter, a speaker, a buzzer, a touch panel, various operation switches, a key, and the like. The display device of the HMI 400 displays an image based on display data generated by the display control device 40.

The traveling driving force output device 500 outputs a traveling drive force (torque) for a vehicle to travel to a driving wheel. The traveling driving force output device 500 includes, for example, a combination of an internal-combustion engine, an electric motor, a transmission or the like, and an electronic control unit (ECU) that controls these components. The brake device 510 includes, for example, a brake caliper, a cylinder that transfers hydraulic pressure to the brake caliper, an electric motor that generates hydraulic pressure in the cylinder, and a brake ECU. The steering device 520 includes, for example, a steering ECU and an electric motor.

[Configuration of the Display Control Device 40]

Figure 2:
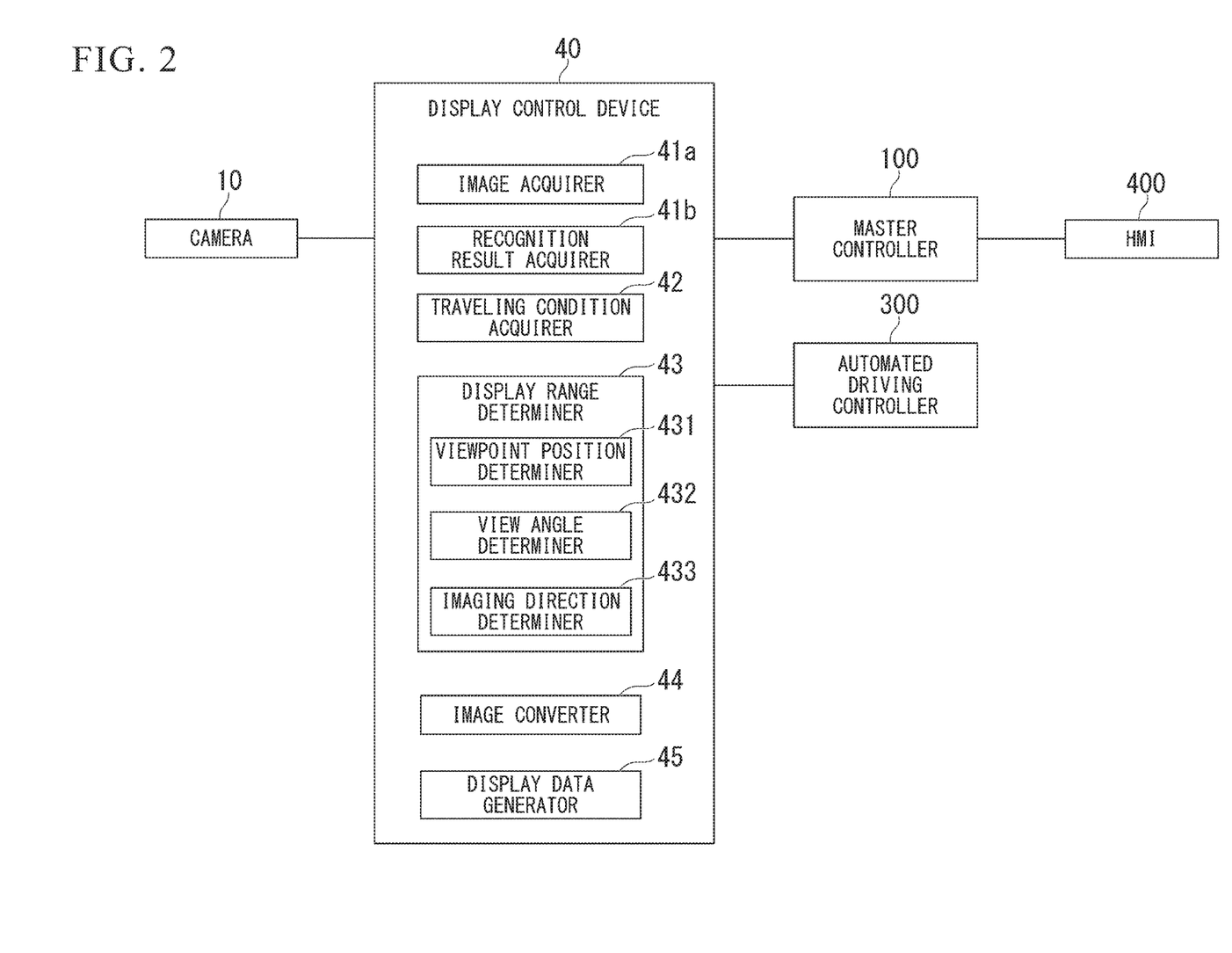
FIG. 2 is a block diagram showing an example of a functional configuration of the display control device 40.

Hereinafter, the configuration example of the display control device 40 of the embodiment will be described. FIG. 2 is a functional configuration diagram of the display control device 40. The display control device 40 includes, for example, an image acquirer 41a, a recognition result acquirer 41b, a traveling condition acquirer 42, a display range determiner 43, an image converter 44 and a display data generator 45.

These components are realized by a hardware processor such as, for example, a CPU executing a program (software). In addition, some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation.

In addition, the display control device 40 may be a device which is realized by one housing, or may be a device which is realized by a plurality of housings. For example, the display control device 40 may be a computer system which is realized by connecting a plurality of in-vehicle computers on a network. In addition, the display control device 40 may be a general-purpose computer, or may be a dedicated in-vehicle computer having a limited function.

In addition, at least one or more functions of the respective functions of the display control device 40 may be realized in another device. That is, the display control device 40 does not necessarily have all the functions, and may have some of the functions.

In FIG. 2, the image acquirer 41a acquires a captured image in the vicinity of the host vehicle which is captured by the camera 10. The camera 10 may be a camera system constituted by a plurality of cameras. For example, the imaging ranges of a plurality of cameras are superimposed on one another, whereby an object to be imaged may be imaged three-dimensionally from different angles, or the vicinity of the host vehicle M may be imaged throughout the whole circumference.

The recognition result acquirer 41b acquires a recognition result of the position, speed, acceleration, traveling lane, distance, or the like of an object such as another vehicle present in the vicinity of the host vehicle which is recognized in the automated driving control unit 300.

The traveling condition acquirer 42 acquires the traveling condition of the host vehicle M detected by the vehicle sensor 70. The traveling condition of the host vehicle M detected by the vehicle sensor 70 includes some or all of, for example, the speed, acceleration, jerk, or angular velocity (yaw rate) around a vertical axis of the host vehicle M, the direction (orientation) of the host vehicle M, and the like.

The display range determiner 43 determines the display range of a peripheral image when a peripheral image (virtual image) indicating the peripheral situation of the host vehicle M is displayed on a display in accordance with the traveling condition acquired by the traveling condition acquirer 42. The display range is a range of a landscape which is displayed as an image in a predetermined frame. The display range determiner 43 determines the display range of a peripheral image by determining at least one of the viewpoint position of a virtual viewpoint, an angle of view from the virtual viewpoint, and an imaging direction (a gaze direction) from the virtual viewpoint in accordance with the traveling condition. The display range determiner 43 includes, for example, a viewpoint position determiner 431, a view angle determiner 432, and an imaging direction determiner 433.

The viewpoint position determiner 431 determines the viewpoint position of a virtual viewpoint in accordance with the traveling condition. The virtual viewpoint is an imaging position of a virtual camera when the imaging position of an actual camera 10 is set to an actual viewpoint. A predetermined correction process (image conversion) is performed on a captured image which is captured by the camera 10, and thus a captured image captured from an actual viewpoint can be converted into a virtual image captured from the virtual viewpoint. For example, the viewpoint position determiner 431 determines the viewpoint position of the virtual viewpoint as a position at which the host vehicle M is viewed from above. In addition, the viewpoint position determiner 431 may determine the viewpoint position of the virtual viewpoint as a position at which the host vehicle M is viewed from behind.

The view angle determiner 432 determines the angle of view from the virtual viewpoint in accordance with the traveling condition. The angle of view is a widened angle of an imaging range centering on the optical axis direction of a camera. A virtual image on which image correction for widening an angle of view is performed becomes wider in the display range than an original image. On the other hand, a virtual image on which image correction for narrowing an angle of view is performed becomes narrower in the display range than an original image.

The imaging direction determiner 433 determines the imaging direction (gaze direction or optical axis direction) of a virtual camera in accordance with the traveling condition. The imaging direction of a virtual camera can be represented as a solid angle from the virtual viewpoint. The imaging direction can be represented at an azimuth angle in a horizontal direction and an angle of depression (or an angle of elevation) in a height direction.

When the traveling condition is changed, the display range determiner 43 changes at least one of the viewpoint position of the virtual viewpoint, an angle of view from the virtual viewpoint, and an imaging direction (a gaze direction) from the virtual viewpoint. The display range determiner 43 determines the display range of a peripheral image in a virtual image when a captured image is converted on the basis of the viewpoint position of the virtual viewpoint, the angle of view from the virtual viewpoint, and the imaging direction from the virtual viewpoint of which at least one is changed. In addition, the display range determiner 43 may simultaneously change any two or more of the viewpoint position of the virtual viewpoint, the angle of view from the virtual viewpoint, or the imaging direction from the virtual viewpoint.

For example, the change of the traveling condition is a change in the speed of the host vehicle M. When the speed of the host vehicle M increases, the display range determiner 43 determines the display range of a peripheral image so as to include a landscape up to a longer distance in front of the host vehicle M. For example, the display range determiner 43 can change the display range of the peripheral image so as to include a landscape up to a longer distance in front of the host vehicle M by changing the imaging direction (the gaze direction) to an upward direction. Since the display range of the peripheral image is changed so as to include a landscape up to a longer distance in front of the host vehicle M, the display range determiner 43 can give a margin of forward confirmation to an occupant in a case where the speed increases.

In addition, when the speed of the host vehicle M decreases, the display range determiner 43 determines a forward range from the host vehicle M in the display range of the peripheral image so that it becomes narrower than when the speed of the host vehicle M increases. For example, the display range determiner 43 can determine the forward range from the host vehicle M in the display range of the peripheral image so that it becomes narrower than when the speed of the host vehicle M increases by changing the imaging direction to a downward direction. Thereby, the display range determiner 43 can allow an occupant to confirm the forward direction of the host vehicle M in detail.

In addition, the display range determiner 43 widens the display range by raising the viewpoint position. As a result, the display range can be changed so as to include a landscape up to a longer distance in front of the host vehicle M in the display range. In addition, the display range determiner 43 narrows the display range by dropping the viewpoint position. As a result, the forward range from the host vehicle M in the display range can be changed so as to become narrower than in a case where the viewpoint position is raised.

[Amount of Change in Image Range Regulation Element with Respect to Amount of Change in Speed]

In addition, the display range determiner 43 may reduce the amount of change in an angle of view, a viewpoint position, or an imaging direction (which may hereinafter be referred to as an image range regulation element) in a case where the speed of the host vehicle M is in a high-speed region, and increase the amount of change in the image range regulation element in a case where the speed is in a low-speed region. In addition, instead, the amount of change in the display range of the peripheral image may be adjusted. Thereby, the display range determiner 43 can make the magnitude of change in sensory speed and the amount of change in the display range identical with each other, and prevent the display range from excessively widening during high speed travel while suppressing the occurrence of discomfort with a change in the display range.

Hereinafter, reference will be made to FIG. 3 to describe an example of the amount of change in an image range regulation element with respect to a change in speed.

Figure 3:
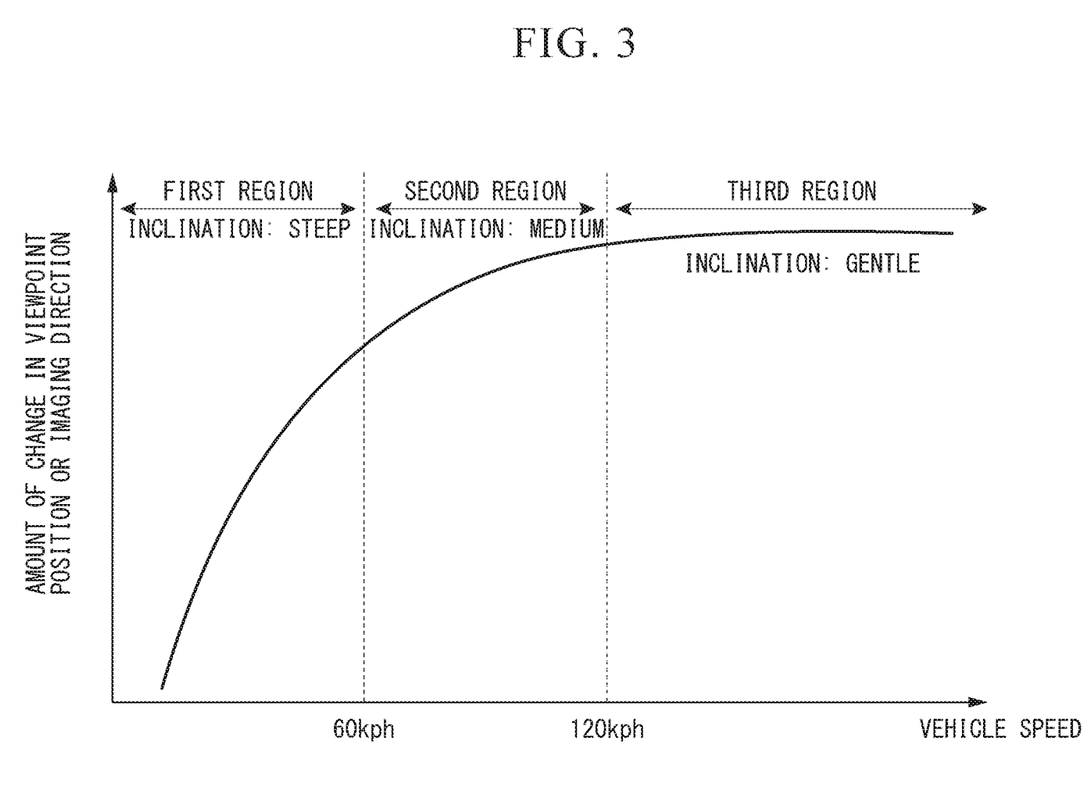
FIG. 3 is a diagram showing an example of a viewpoint position or a change of the amount of change in an imaging direction with respect to a change in the speed of a host vehicle M in the display control device 40.

In FIG. 3, the horizontal axis of the graph is the speed of the host vehicle M. In addition, the vertical axis of the graph is the amount of change in an image range regulation element, and shows the amount of change in a viewpoint position or an imaging direction. Here, a region in which speed is less than 60 kph is set as a first region, a region in which speed is equal to or greater than 60 kph and less than 120 kph is set as a second region, and a region in which speed is equal to or greater than 120 kph is set as a third region.

In the first region in which speed is less than 60 kph, the inclination of the graph is steep, and the amount of change in the viewpoint position or the imaging direction with respect to an increase in speed is great.

In addition, in the second region in which speed is equal to or greater than 60 kph and less than 120 kph, the inclination of the graph is approximately medium, and the amount of change in the viewpoint position or the imaging direction with respect to an increase in speed becomes gentler than in the first region.

Further, in the third region in which speed is equal to or greater than 120 kph, the inclination of the graph is gentle, and the amount of movement of the display range with respect to an increase in speed is small That is, when speed increases, the amount of change in the viewpoint position or the imaging direction in the display region becomes gentler than in the second region.

Since the change of the display region with respect to an increase in speed as shown in FIG. 3 is close to the change of a scene with respect to an increase in speed which is felt by an occupant, it is possible to reduce discomfort with respect to the change of the display region.

In addition, the display range determiner 43 may determine the display range of the peripheral image so that an interval from the rear end portion of the host vehicle M to the rear at a predetermined distance becomes the display range. Thereby, the rear situation of the host vehicle can be displayed, and a sense of security can be given to an occupant as compared with simple display of a front state.

Meanwhile, the display range may be changed in accordance with a recognition range in the automated driving control unit 300. For example, the automated driving control unit 300 changes the recognition range in accordance with speed. Display according to the recognition state of the automated driving control unit 300 can be performed by matching the display range in the display control device 40 with the recognition range of the automated driving control unit 300.

In addition, at least one of the viewpoint position, the angle of view or the gaze direction may be able to be manually determined or adjusted by, for example, an occupant. For example, in a low-speed region, the viewpoint position may be determined so that the display range becomes an overhead view image through an occupant's operation.

The image converter 44 converts a captured image acquired by the image acquirer 41a into a virtual image in accordance with the display range of the peripheral image determined by the display range determiner 43. The image converter 44 converts, for example, original data of a captured image captured from an actual viewpoint into data viewed from a virtual viewpoint using a predetermined conversion table. The conversion table is a table obtained by mapping coordinates of each pixel of original data and coordinates of each pixel of a virtual image after conversion. Alternatively, a process of conversion into a virtual image may be performed in accordance with an arithmetic operation expression.

For example, the image converter 44 converts the size, shape, display position in the display range, or the like of an image of the host vehicle M, another vehicle, a road, an obstacle, or the like included in a captured image into a size or the like according to the display range of the peripheral image determined by the display range determiner 43. Even in a case where the display range of the peripheral image is changed by performing image conversion, it is possible to improve convenience without causing discomfort to an occupant. Additionally, the image converter 44 may perform image conversion on captured images captured by a plurality of cameras.

The display data generator 45 generates display data in the display range of the peripheral image displayed on the HMI 400 and transmits the generated display data to the master controller 100. The master controller 100 controls the HMI 400 such that it displays the transmitted display data. Hereinafter, an example of a process of generating display data in the display data generator 45 will be described.

First, the display data generator 45 recognizes an object included in a captured image converted by the image converter 44. The object is, for example, a host vehicle, another vehicle, a mark on a road, an obstacle, a structure, or the like. Recognizing an object involves, for example, recognizing the type of another vehicle, the type of a division line, the type of a symbol drawn on a road surface, the type of an obstacle, the type of a structure, or the like. The recognition of an object can be performed by a machine learning method such as, for example, deep learning. When a plurality of objects are included in a captured image, the display data generator 45 recognizes each of the objects. In addition, the display data generator 45 refers to a recognition result recognized in the automated driving control unit 300, and adds the recognition result to a recognition result based on the captured image. In this case, in a case where the recognition result of the captured image and the recognition result recognized in the automated driving control unit 300 are different from each other, an object may be selected on the basis of the reliability of information, and a selected result may be learned. In this case, the display data generator 45 may output an alert to an occupant.

Next, the display data generator 45 generates an animation image on the basis of the position of a recognized object. More specifically, the display data generator 45 may generate an animation image on the basis of the recognized object, the position of the object, information relating to a road, acquired from the navigation device 50, on which the host vehicle M is traveling (the shape of a road or the number of lanes), and the like. The animation image is an image in which a host vehicle, another vehicle, paint on a road, an object such as a structure, information relating to a road acquired from the navigation device 50, or the like included in the captured image is represented by an icon, a character, a sample image, a vehicle, a polygon or the like indicating the outer shape of a road, or the like. The animation image may include display of a distance to another vehicle to be described later, the speed of another vehicle, or the like. In addition, the animation image may be a moving image, or may be still images which are updated at a predetermined interval. The display data generator 45 may calculate and display information such as the speed, acceleration, turning angle, or the like of the host vehicle M or another vehicle in association with the animation image.

The display data generator 45 generates an animation image of a range assumed by adding parameters such as an angle of view, a viewpoint, or an imaging direction on the basis of the absolute coordinates of an object. The position of an object in the animation image is calculated on the basis of the absolute coordinates. As a result, before and after the display range of the peripheral image is changed by the display range determiner 43, an absolute positional relationship from which the animation image originates does not change. Thereby, the display data generator 45 can generate display data so that a relative positional relationship between objects does not change before and after a change in the display range.

Even in a case where the display range of the peripheral image is changed by the peripheral image being generated as described above, a positional relationship between the host vehicle M and the object recognized by the object recognition device 16 is changed following the display range. Thereby, even in a case where the display range is changed, an occupant of the host vehicle M can recognize the above relative positional relationship more reliably.

[Configuration of HMI 400]

Figure 4:
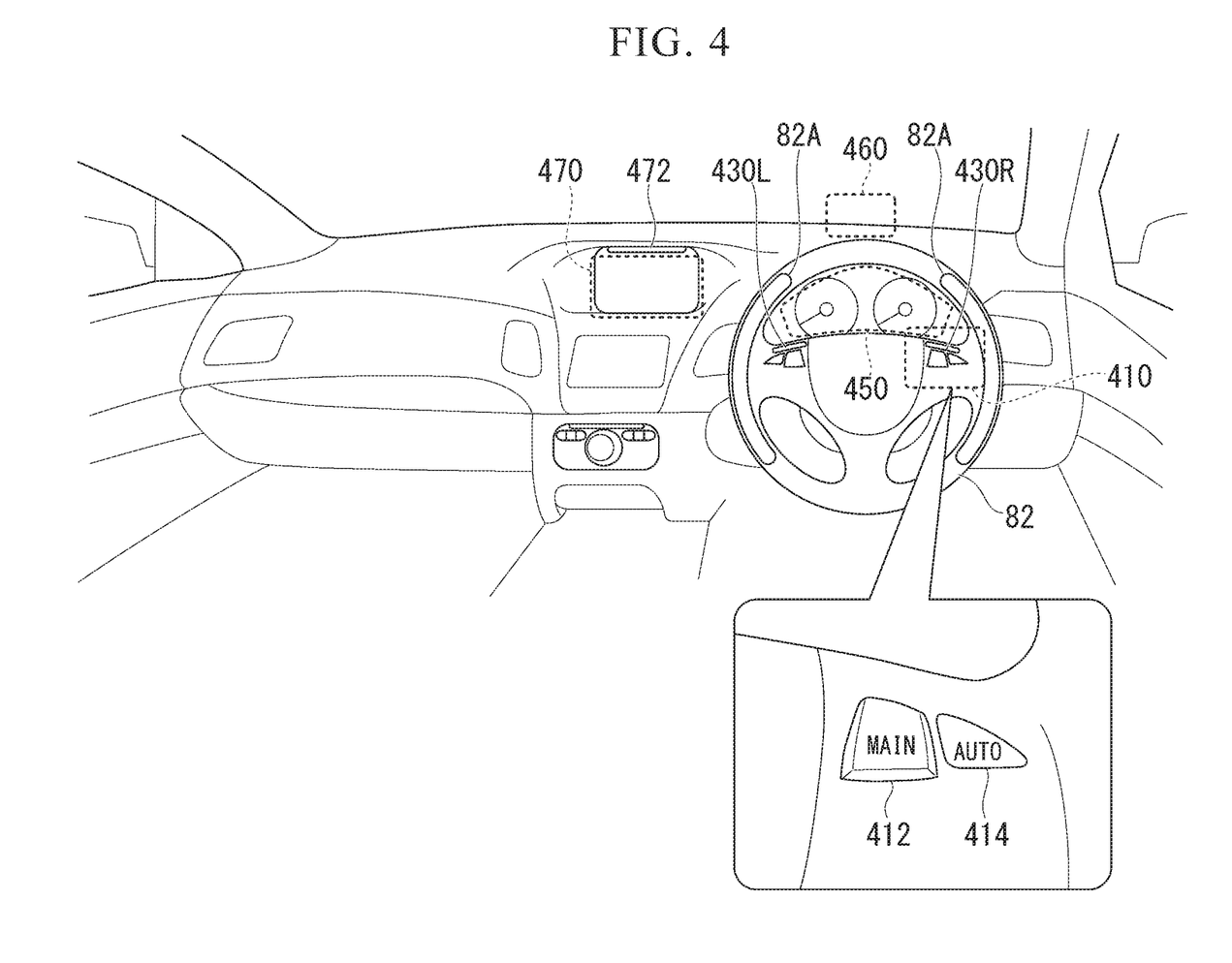
FIG. 4 is a diagram showing an example of a HMI 400 in the host vehicle M.

Next, the configuration example of the HMI 400 will be described. FIG. 4 is a diagram showing an example of the HMI 400 in the host vehicle M. In the drawing, the HMI 400 includes, for example, a first operating unit 410, light emitters 430R and 430L, a first display 450, a head up display (HUD) (second display) 460, and a third display 470.

The first operating unit 410 includes, for example, a main switch 412 and an auto switch 414. The main switch 412 is a switch for making it possible to start driving assistance.

In a case where the main switch 412 is operated, the host vehicle M performs a process in a preparation stage before driving assistance is executed. In a case where the main switch 412 is operated, the display control device 40 may acquire a recognition result in the vicinity of the host vehicle M recognized by the automated driving control unit 300, and start to generate display data. The auto switch 414 is a switch for starting driving assistance in reality in a state where driving assistance can be started. The turned-on states of the turn light emitters 430R and 430L are controlled by control of the HMI controller 120.

The first display 450 displays information required for traveling during manual driving or automated driving of the host vehicle M or information relating to instructions to an occupant.

The third display 470 displays display data of a virtual image generated by the display control device 40. For example, during automated driving, the third display 470 may display a recognition result of an object present in the vicinity of the host vehicle recognized when automated driving is performed along with the virtual image. The recognition of an object present in the vicinity of the host vehicle can be performed in the object recognition device 16. The third display 470 is installed at, for example, the central portion of an instrument panel. The third display 470 is, for example, an LCD, an organic EL display device, or the like. The third display 470 may display an image associated with a navigation process executed by the navigation device 50, a partner's video in a TV phone, or the like. In addition, the third display 470 includes, for example, a light emitter 472. The light emitter 472 emits light in a case where the third display 470 can be used.

[Operation of Display Control Device 40]

Figure 5:
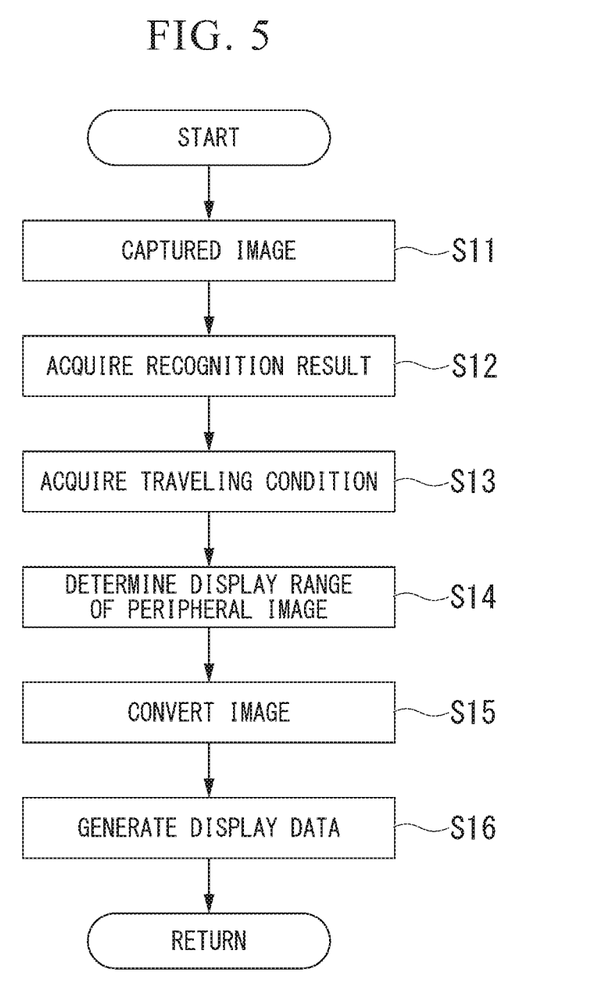
FIG. 5 is a flow chart showing an example of an operation of the display control device 40.

Next, the operation of the display control device 40 will be described. FIG. 5 is a flow chart showing an example of the operation of the display control device 40. The process of the present flow chart is repeatedly executed, for example, in a predetermined period.

In FIG. 5, the image acquirer 41a acquires a captured image in the vicinity of the host vehicle captured by the camera 10 (step S11).

Next, the recognition result acquirer 41b acquires a recognition result of the position, speed, acceleration, traveling lane, distance, or the like of an object in the vicinity of the host vehicle recognized in the automated driving control unit 300 (step S12).

Next, the traveling condition acquirer 42 acquires the traveling condition of the host vehicle M (step S13). Additionally, the processes of step S11 to step S13 may be executed mutually asynchronously.

Next, the display range determiner 43 determines the display range of the peripheral image by changing at least one of a viewpoint position from a virtual viewpoint, an angle of view from the virtual viewpoint, or a gaze direction from the virtual viewpoint in accordance with the traveling condition of the host vehicle M (step S14). The display range of the peripheral image is a range which is displayed in the HMI 400. The display range determiner 43 may determine the display range of the peripheral image, for example, in accordance with the resolution (such as an aspect ratio) of the third display 470.

Meanwhile, any of the viewpoint position, the angle of view, or the gaze direction is changed in accordance with the traveling condition of the host vehicle M, but the amount of change in the viewpoint position, the angle of view, or the gaze direction according to the traveling condition can be set in advance. The display range determiner 43 may change the display range of the peripheral image in accordance with their settings.

Next, the image converter 44 converts the captured image acquired by the image acquirer 41a into a virtual image in accordance with the display range of the peripheral image determined by the display range determiner 43 (step S15).

Next, the display data generator 45 generates display data in the display range of the peripheral image and outputs the generated display data to the master controller 100 (step S16), and the process of one routine of the present flow chart is terminated.

Hereinafter, a process of changing the display range of the peripheral image in accordance with the traveling condition of the host vehicle M will be described.

[First Example of Change in Display Range]

Figure 6:
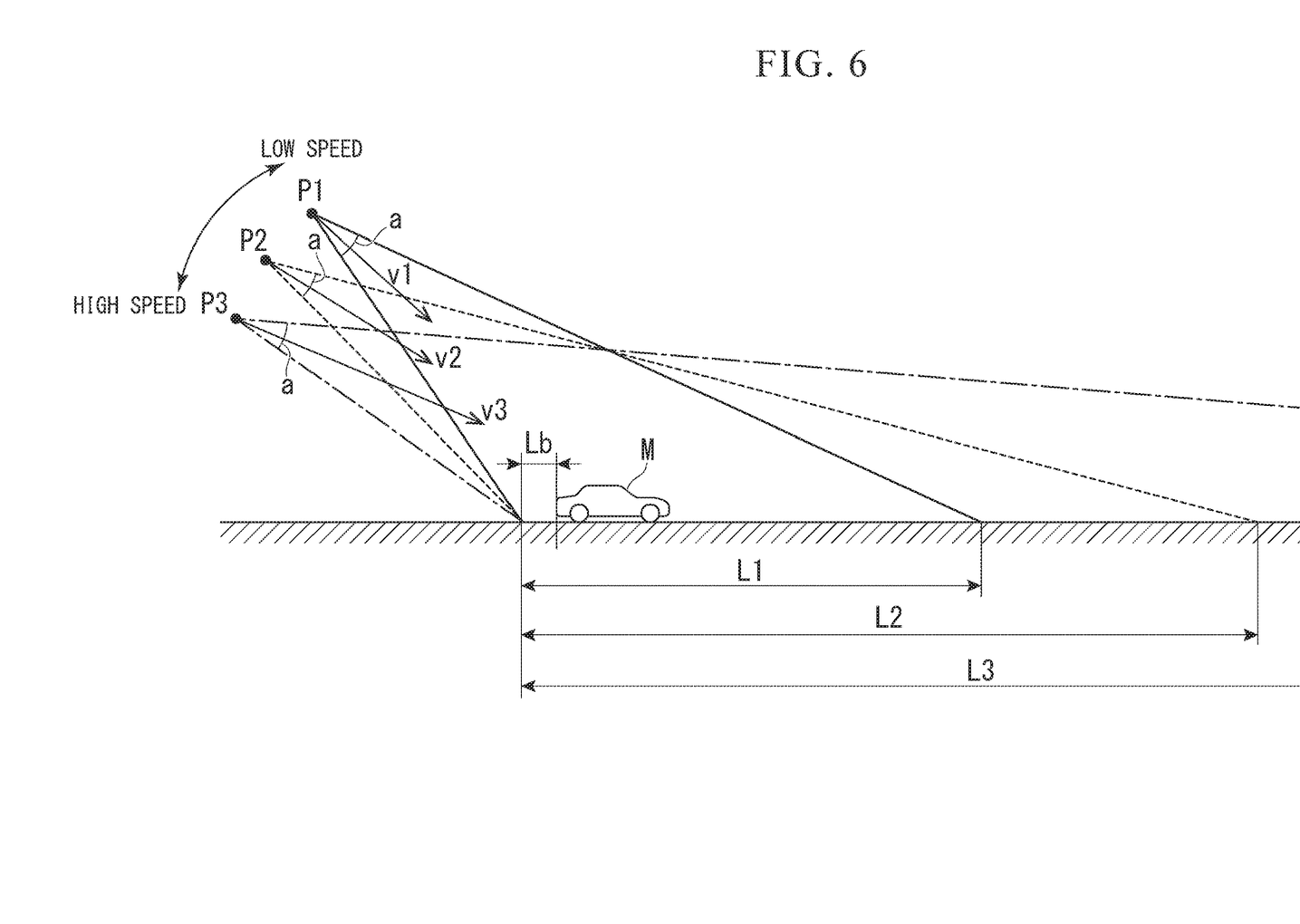
FIG. 6 is a diagram showing an example of movement of the viewpoint position of a virtual viewpoint and the imaging direction of an imaging camera in the display control device 40.

A first example of a change in a display range shown in FIG. 6 shows a case where the display range determiner 43 lowers the viewpoint position of the virtual viewpoint and changes a downward imaging direction to a horizontal direction (so that the angle of depression becomes smaller) in a case where the speed of the host vehicle M is high, whereas the display range determiner raises the viewpoint position of the virtual viewpoint and changes the imaging direction to a downward direction (so that the angle of depression becomes larger) in a case where the speed of the host vehicle M is low.

In FIG. 6, P1 to P3 show the viewpoint positions of virtual viewpoints, and v1 to V3 show the imaging directions of virtual cameras. The display ranges associated with the viewpoint positions P1 to P3 are represented by L1 to L3. In the first example, an angle of view a at the viewpoint positions P1 to P3 is assumed to be fixed. In addition, FIG. 6 shows a planar outline viewed from a lateral side in the traveling direction of the host vehicle M for describing these parameters. In reality, the viewpoint positions P1 to P3 have three-dimensional coordinates for the host vehicle M, and the imaging direction v1 to v3 have three-dimensional vectors. In addition, the display range L is a planar region.

For example, the display range at the viewpoint position P1 is L1. The display range at the viewpoint position P2 is L2. In addition, the display range at the viewpoint position P3 is L3. When the speed of the host vehicle M changes from a low speed to a high speed, the display control device 40 changes the viewpoint position to P1->P2->P3, and changes the imaging direction to v1->v2->v3. As a result, the display range is changed so as to include a landscape up to a longer distance in front of the host vehicle M as in L1->L2->L3. On the other hand, in a case where speed decreases, the display control device 40 changes the display range L as in L3->L2->L1. Thereby, the end of the host vehicle M on the forward side in the display range comes close to the host vehicle M in accordance with a decrease in speed, and the display range becomes narrower than in a case where speed increases. In a case where speed increases, the display range L is changed so as to include a landscape up to a longer distance in front of the host vehicle M, whereby it is possible to allow an occupant to have a margin for speed.

Here, the display control device 40 determines the display ranges L1 to L3 so as to include a situation within a predetermined distance (Lb) from the rear end portion of the host vehicle M. Thereby, the display control device 40 can always ascertain the rear situation of the host vehicle M by preventing the rear of the vehicle from being out of sight even in a case where the far side in front of the host vehicle M is widened.

The display control device 40 may arrange the rear end portions (left end portions in the drawing) of the display ranges L1 to L3 at the distance Lb from the rear end portion of the host vehicle M when the imaging direction is changed to v1->v2->v3. That is, the distance Lb from the rear end portion may be changed in accordance with a change in the imaging direction, or may be constant. Thereby, even in a case where the display range of the peripheral image is changed, a relative positional relationship between the host vehicle M and another vehicle or the like can be easily ascertained by making the display position of the host vehicle M approximately constant.

Figure 7:
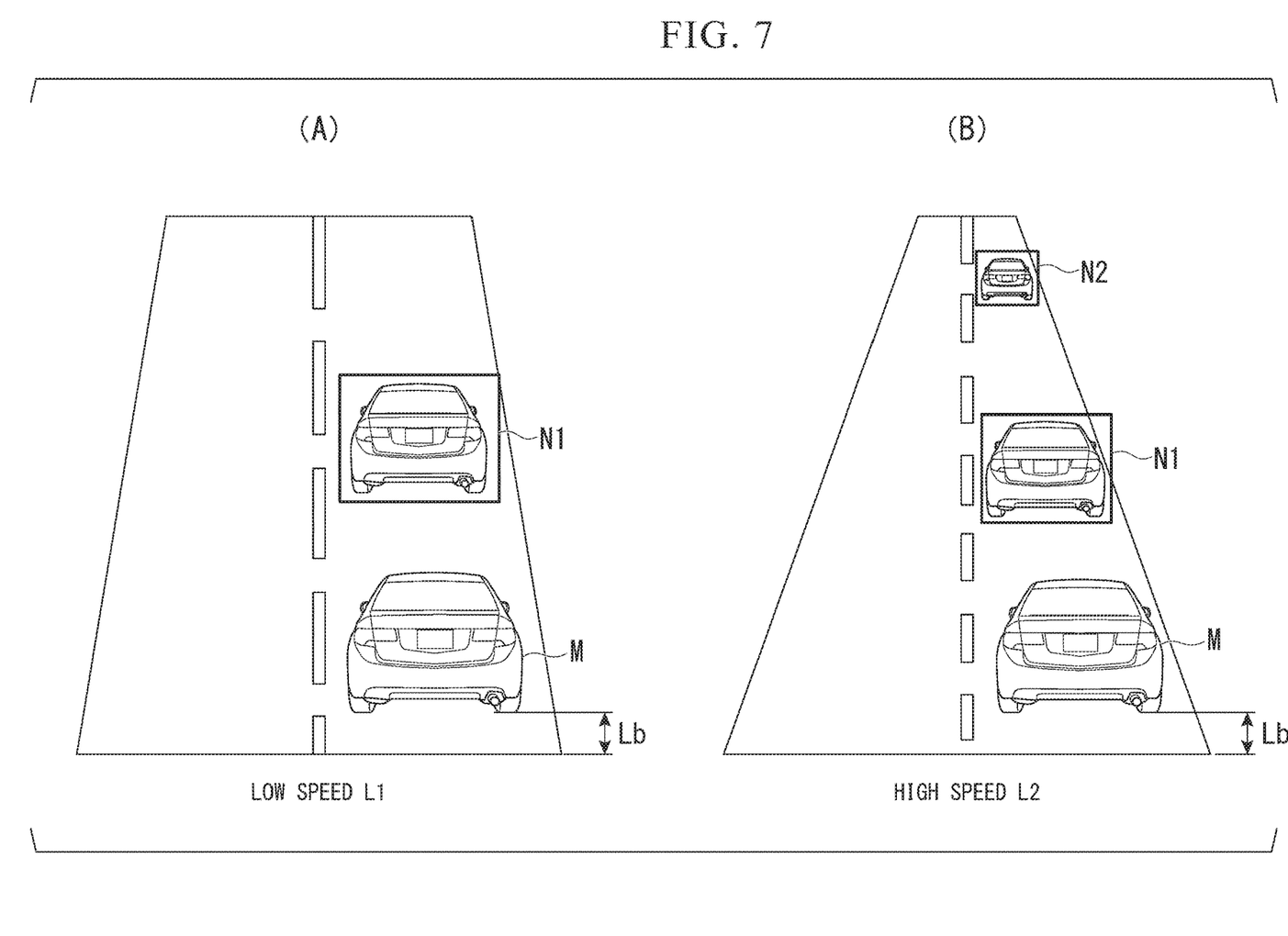
FIG. 7 is a diagram showing an example of movement of a display range in the movement of the viewpoint position of a virtual viewpoint and the imaging direction of an imaging camera in the display control device 40.

Next, the display example of the HMI 400 with the movement of the display range described in FIG. 6 will be described. FIG. 7 is a diagram showing an example of movement of a display range in the movement of the viewpoint positions of a virtual viewpoint and the imaging direction of an imaging camera in the display control device 40.

(A) in FIG. 7 is a display example of the HMI 400 based on the display range L1 of FIG. 6. An image generated on the basis of the display range L1 has a large angle of depression (angle in a horizontal direction) from the virtual viewpoint, and thus makes it possible for the vicinity of the host vehicle M to be displayed in the low-speed region in detail.

(B) in FIG. 7 is a display example of the HMI 400 in the display range L3 in FIG. 6. An image generated on the basis of the display range L3 has a small angle of depression from the virtual viewpoint, and thus makes it possible for the front of the host vehicle M to be displayed up to a longer distance in a high-speed region.

In (A) and (B) of FIG. 7, another vehicle N1 is displayed in front of the host vehicle M. A trapezoidal mark indicating recognition as another vehicle by the automated driving control unit 300 is superimposed and displayed on the captured image of another vehicle N1. That is, the trapezoidal mark indicates that the automated driving control unit 300 recognizes another vehicle N1 and performs automated driving on the basis of the behavior of another vehicle N1. Since it is possible to confirm that the automated driving control unit 300 recognizes another vehicle N1 by superimposing and displaying the trapezoidal mark on the captured image, a sense of security with respect to automated driving can be given to an occupant.

In addition, in a case where the display range L1 is changed to the display range L3 by a change in the viewpoint position and the gaze direction, the shapes and display positions of captured images of another vehicle N1 and another vehicle N2 may also be changed.

In (A) and (B) of FIG. 7, since the display range is determined so that a rearward horizontal distance from the rear end portion of the host vehicle M is set to be within a predetermined value, the display position of the host vehicle M in the HMI 400 can be made approximately constant. Thereby, even in a case where the display range is switched to L1 and L3, a positional relationship between the host vehicle M and another vehicle is easily confirmed.

[Movement of Display Range (Second Example)]

Figure 8:
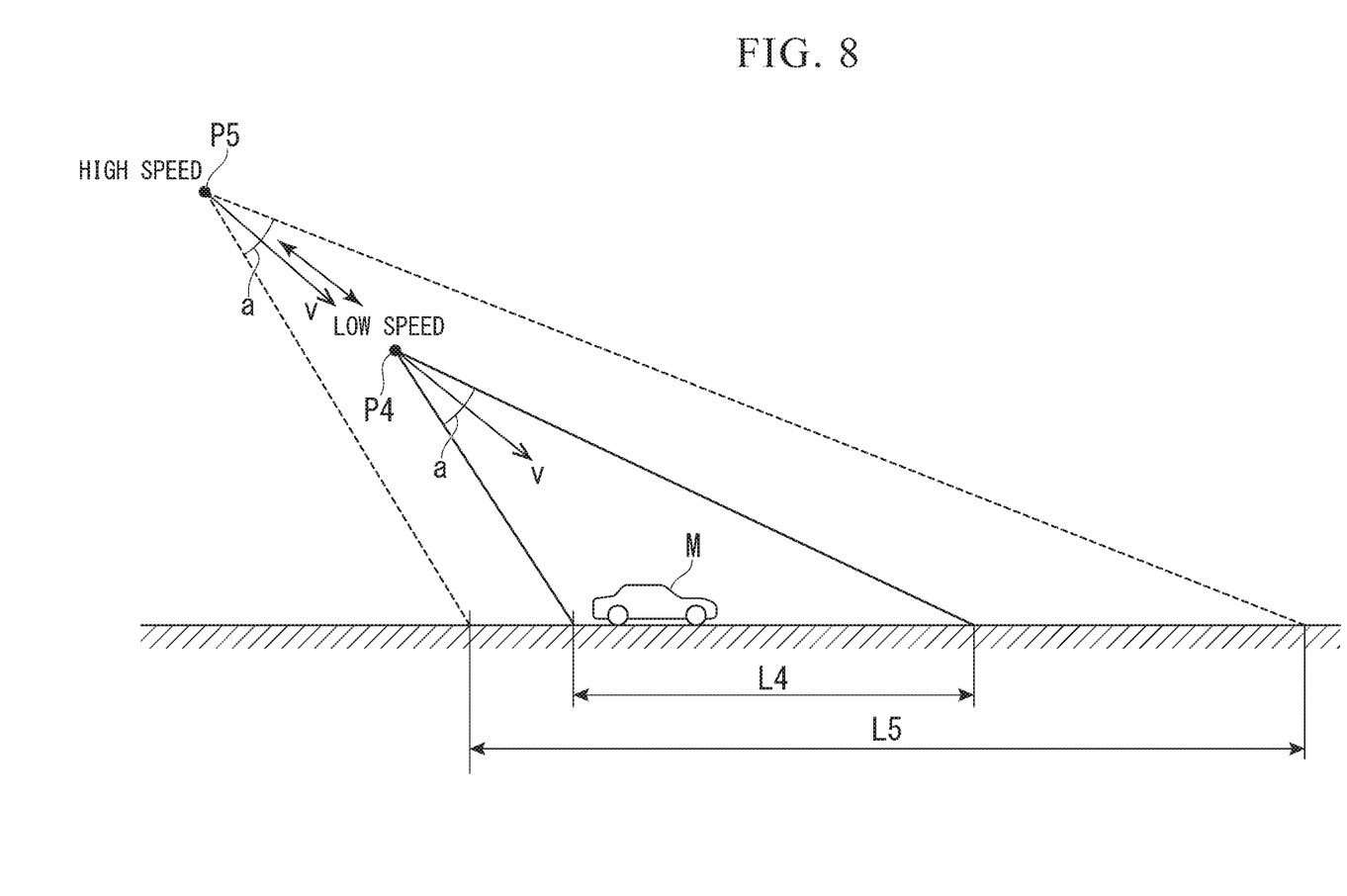
FIG. 8 is a diagram showing an example of movement of the height of the viewpoint position of a virtual viewpoint in the display control device 40.

Next, an example of movement of the display range with respect to the movement of the height of the viewpoint position of a virtual viewpoint (a second example) will be described. FIG. 8 is a diagram showing an example of movement of the height of the viewpoint position of a virtual viewpoint in the display control device 40.

In FIG. 8, similarly to FIG. 6, P4 to P5 show the viewpoint positions of virtual viewpoints, a shows the angle of view of the virtual viewpoint, and v shows the imaging direction of a virtual camera. The display range at the viewpoint position P4 is L4. In addition, the display range at the viewpoint position P5 is L5. Here, the angle of view a and the imaging direction v are assumed not to be changed at the viewpoint position P4 and the viewpoint position P5. In a case where the viewpoint position is changed to P4->P5 when the speed of the host vehicle M changes from a low speed to a high speed, the display range moves to L4->L5. That is, in a case where speed increases, the display control device 40 changes the display range so as to include a landscape up to a longer distance in front of the host vehicle M as in L4->L5, and changes the display range so as to include a landscape up to a longer distance in the rear of the host vehicle M. On the other hand, in a case where speed decreases, the display control device 40 changes the display range of the host vehicle M on the front side and (or) the rear side so as to be further reduced to the host vehicle M side than in a case where speed increases as in L5->L4. In a case where speed increases, the display range L is further extended to the front side and rear side of the host vehicle M than in a case where speed decreases, whereby it is possible to allow an occupant to have a margin for speed.

In the second example shown in FIG. 8, since the imaging directions of the host vehicle and another vehicle in the display range are not changed by fixing (not changing) the angle of view a and the imaging direction v, it is possible to reduce discomfort with respect to a change in display. In addition, since the host vehicle M can be displayed even when the display range is changed, it is possible to ascertain a relative positional relationship between the host vehicle M and another vehicle.

In FIG. 8, a case where the display range is extended even in the rear of the host vehicle M is shown, but, for example, similarly to FIG. 6, the rear ends of the display range may be fixed (arranged). That is, the display range in the rear of the host vehicle M may be changed in accordance with a change in the viewpoint position of a virtual viewpoint, or may be constant. In FIG. 8, similarly to FIG. 6 described above but not shown, a distance from the rear end portion of the host vehicle M to the end portion of the display range (the distance Lb in FIG. 6) may be changed in accordance with a change of the imaging position, or may be constant.

Even in a case where the angle of view from a virtual point or the gaze direction from the virtual point is changed, the display range in the rear of the host vehicle M may be changed, or may be constant.

Figure 9:
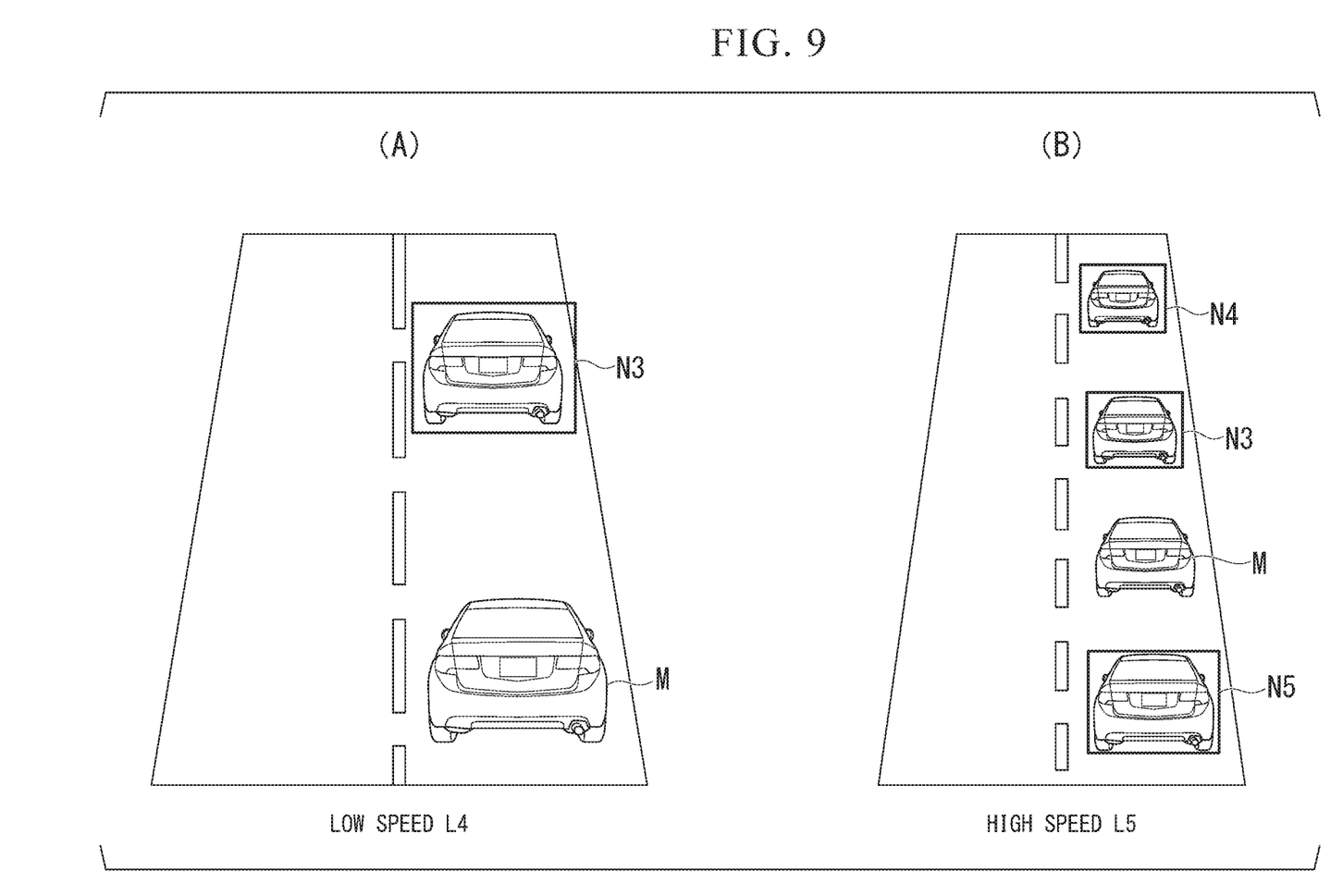
FIG. 9 is a diagram showing an example of movement of a display range in the movement of the height of the viewpoint position of a virtual viewpoint in the display control device 40.

Next, the display example of the HMI 400 with the movement of the display range described in FIG. 8 will be described. FIG. 9 is a diagram showing an example of movement of a display range in the movement of the viewpoint position of a virtual viewpoint in the display control device 40.

(A) in FIG. 9 is a display example of the HMI 400 in the display range L4 of FIG. 8. Since the display range L4 is low in the height of the virtual viewpoint, the vicinity of the host vehicle M can be displayed greatly and in detail. In (A) of FIG. 9, an animation image of another vehicle N3 is displayed in front of the host vehicle M. A trapezoidal mark indicating recognition as another vehicle by the automated driving control unit 300 is superimposed and displayed on the animation image of another vehicle N3. Since it is possible to confirm that the automated driving control unit 300 recognizes another vehicle N3 by displaying the trapezoidal mark, a sense of security with respect to automated driving can be given to an occupant.

(B) in FIG. 9 is a display example of the HMI 400 in the display range L5 of FIG. 8. Since the display range L5 is great in the height of the virtual viewpoint, the vicinity of the host vehicle M can be displayed widely in a high-speed region. In (B) of FIG. 9, an animation image of another vehicle N4 is displayed in front of the host vehicle M in addition to another vehicle N3. In addition, an animation image of another vehicle N5 is displayed in the rear of the host vehicle M. Trapezoidal marks indicating recognition as another vehicle by the automated driving control unit 300 are superimposed and displayed on the animation images of other vehicles N3 to N5. Since it is possible to confirm that the automated driving control unit 300 recognizes another immediately preceding vehicle N3, another distant vehicle N4, and another rear vehicle N5 by displaying the trapezoidal marks, a sense of security with respect to automated driving can be given to an occupant.

In (A) and (B) of FIG. 9, since the sizes of or distance between the host vehicle and another vehicle is simply changed such as extended or reduced in accordance with the height of the virtual viewpoint, it is possible to reduce discomfort with respect to a change in the display range.

According to the embodiment described above, the display control device 40 can perform appropriate display of the vicinity of the host vehicle according to the state of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Vehicle system
10 Camera
12 Radar device
14 Viewfinder
16 Object recognition device
20 Communication device
40 Display control device
41a Image acquirer
41b Recognition result acquirer
42 Traveling condition acquirer
43 Display range determiner
431 Viewpoint position determiner
432 View angle determiner
433 Imaging direction determiner
44 Image converter
45 Display data generator
50 Navigation device
60 MPU
70 Vehicle sensor
80 Driving operator
100 Master controller
110 Switching controller
120 HMI controller
200 Driving assistance controller
300 Automated driving control unit
320 First controller
340 Second controller
400 HMI
500 Traveling driving force output device
510 Brake device
520 Steering device
M host vehicle

What is claim is:

1. A display control device comprising:
a display configured to display a peripheral image indicating a peripheral situation of a host vehicle in a display range viewed from a predetermined virtual viewpoint;
a memory that stores instructions; and
one or more processors that execute the instructions to:
determine a viewpoint position of the virtual viewpoint, an angle of view from the virtual viewpoint, or a gaze direction from the virtual viewpoint in accordance with a traveling condition of the host vehicle,
wherein the traveling condition of the host vehicle includes a speed of the host vehicle, and
wherein the one or more processors further execute the instructions to:
change the display range of the peripheral image by changing the viewpoint position, the angle of view, or the gaze direction to include a longer distance in front of the host vehicle in the display range of the peripheral image as the speed of the host vehicle increases, and
reduce an amount of a rate of the change in the viewpoint position, the angle of view, or the gaze direction as the speed of the host vehicle increases,
wherein the one or more processors further execute instructions to:
in a case that the speed of the host vehicle is less than a first speed, change the viewpoint position, the angle of view, or the gaze direction based on a first amount of the rate of change,
in a case that the speed of the host vehicle is equal to or greater than the first speed, change the viewpoint position, the angle of view, or the gaze direction based on a second amount of the rate of change that is less than the first amount of the rate of change, and
in a case that the speed of the host vehicle is equal to or greater than a second speed that is greater than the first speed, change the viewpoint position, the angle of view, or the gaze direction based on a third amount of the rate of change that is less than the second amount of the rate of change.

2. The display control device according to claim 1, wherein the one or more processors execute instructions to use a longer distance in front of the host vehicle in the display range of the peripheral image by reducing an angle of depression in the gaze direction.

3. The display control device according to claim 1, wherein the one or more processors execute instructions to determine the display range of the peripheral image as a range in which the host vehicle is viewed from above within a predetermined distance from the host vehicle.

4. The display control device according to claim 1, wherein the one or more processors execute instructions to widen the display range of the peripheral image by raising the viewpoint position, and narrows the display range of the peripheral image by lowering the viewpoint position.

5. The display control device according to claim 1, wherein the one or more processors execute instructions to determine the display range of the peripheral image so as to include a situation within a predetermined distance from a rear end portion of the host vehicle.

6. The display control device according to claim 1, wherein the one or more processors execute instructions to recognize an object present in a vicinity of the host vehicle,
wherein the peripheral image is configured such that a relative positional relationship between the host vehicle and the object is capable of being recognized by an occupant of the host vehicle, and
change the relative positional relationship when the display range of the peripheral image is changed.

7. The display control device according to claim 1, wherein the one or more processors execute instructions to:
recognize an object present in a vicinity of the host vehicle; and
generate a peripheral image that is an animation image indicating a peripheral situation of the host vehicle on a basis of a detection result of the object recognizer and a determination result,
wherein the display displays the peripheral image.

8. The display control device according to claim 1, wherein
the display range includes a rear area within a reference distance from the rear end portion of the host vehicle, and
when the viewpoint position, the angle of view, or the gaze direction changes, the reference distance remains unchanged.

* * * * *